Sept. 14, 1965 H. LAUFER 3,206,213

RECORD PLAYERS PICK-UP WEIGHT DETERMINING APPARATUS

Filed Oct. 13, 1961 2 Sheets-Sheet 1

INVENTOR
HELMUT LAUFER
By [signature]
Attorney

Sept. 14, 1965 H. LAUFER 3,206,213

RECORD PLAYERS PICK-UP WEIGHT DETERMINING APPARATUS

Filed Oct. 13, 1961 2 Sheets-Sheet 2

INVENTOR
HELMUT LAUFER

By: Otto John Munz
Attorney

United States Patent Office 3,206,213

Patented Sept. 14, 1965

3,206,213

RECORD PLAYERS PICK-UP WEIGHT DETERMINING APPARATUS

Helmut Laufer, St. Georgen, Black Forest, Germany, assignor to Oskar Steidinger and Siegfried Steidinger, trading as the Firm Gebrueder Steidinger, St. Georgen, Black Forest, Germany

Filed Oct. 13, 1961, Ser. No. 144,871
Claims priority, application Germany, Nov. 8, 1960, St 17,093
2 Claims. (Cl. 274—23)

The invention concerns an apparatus for determining the pick-up support weight, actuated when its tone-arm is lowered on to the tone-arm support and comprises a resilient member and an indicating device connected therewith.

An apparatus is known for changing the pick-up support weight in which an additional weight is arranged in the proximity of the horizontally disposed pivotal axis of the pick-up and is adapted to be longitudinally displaced. For the purpose of compensating to zero supporting weight, the tone-arm is mounted by means of a clamping screw fixed on the bearing part of the horizontal pivotal axis so as to be adjustable in a longitudinal direction in a slot formed on its upper surface. Graduation marks are provided on the slot. After compensation, however, these only allow certain conclusions to be reached concerning the distribution of the natural weight of the tone-arm. It would of course be conceivable to permit the displaceable additional weight to slide along a scale so that conclusions concerning the pick-up supporting weight can be drawn from the adjusted position. Such a device however has the disadvantage that after inserting a pick-up cartridge or insert with a different weight it gives the wrong indication. This error can be removed by a new compensation to zero weight. Its removal however requires effort and can be overlooked. Moreover the device is applicable only where the tone-arm is readily accessible for reading in the region of its horizontally disposed pivotal axis.

A further known device consists of a horizontally swingable supporting arm on the end of which is mounted horizontally disposed pivotal axis of the pick-up. A balanced moment is exerted on the tone arm by a spring arranged in the supporting arm. The anchoring point of the spring is adjustable and its position is indicated by means of a pointer on the surface of the supporting arm. This device is not suitable for directly establishing the pick-up supporting weight and thus not applicable to pick-ups which are provided for different pick-up inserts. This disadvantage could be remedied by using additional adjustment means. This however would necessitate additional attention in using the device and opens up a new source for operational faults. This apparatus too is applicable only in the event the tone-arm is readily accessible for reading in the region of its horizontally disposed pivotal axis.

Furthermore a record player is known which has on its base plate a device mounted thereon to determine the pick-up supporting weight. This device simultaneously acts as pick-up support in the inoperative position. The indication in a device arranged in this manner is not conveniently readable, as the pick-up is positioned thereover. If it is in sunken arrangement, reading is impossible.

In accordance with the invention the disadvantages of known devices are minimised by the fact that the resilient member, which is deflected when the tone arm is lowered on a support, is arranged in the tone-arm and is connected with an indicating device which indicates the supporting weight on the surface of the pick-up. The tone-arm herewith serves at the same time as a protective housing for the device and indication may be effected at any chosen spot of the tone-arm, preferably directly behind the pick-up. Moreover this makes the comparatively delicate device inaccessible to accidental rough usage. The pick-up support serving as an abutment may be a simple pin or in cases where even for that there is no room, a stop situated in the tone-arm socket can be used.

A convenient configuration of the invention consists in that the resilient member consists of a leaf spring clamped at one end extending in the longitudinal direction of the pick-up arm.

An essential advantage of this embodiment consists in that the apparatus is very simple and adapted to be balanced in its state of equilibrium frictionally undamped and thereby without tracking restraint, as any unavoidable frictional forces and the resilient member moving in a circle act in the longitudinal direction of the pick-up arm and are hence unable to produce a friction moment about its horizontal pivotal axis.

A further development of the invention consists in that the free end of the leaf spring carries an indicating scale projecting through the top of the pick-up arm.

A further embodiment of the invention consists in that the free end of the leaf spring is toothed and engages with a toothed wheel of an indicating device which lies in the longitudinal direction of the tone-arm. The particular advantage of this embodiment resides in the fact that the leaf spring, whilst using a gear drive ensuing considerable accuracy of indication despite natural pressure deflection does not require any further attention after initial adjustment.

A further convenient embodiment of the invention consists in that the movements of the resilient member are to be transmitted to an indicating disc, the outer surface of which is provided with marks or numerals and whose axis is so vertically arranged relative to the longitudinal direction of the tone-arm that sections of its circumference are visible through a window in the surface of the arm.

A further expedient embodiment of the invention resides in the fact that the support is a component of the parts adapted to be moved exclusively about the vertical tone-arm swivel axis.

This embodiment of the invention is e.g. applicable to record players which only in the region of the tone-arm socket have a base plate projecting beyond the diameter of the turntable, or in which the tone-arm is supplied as an independent device.

The invention will be described further by way of example with reference to the accompanying drawings in which—

Figure 1:
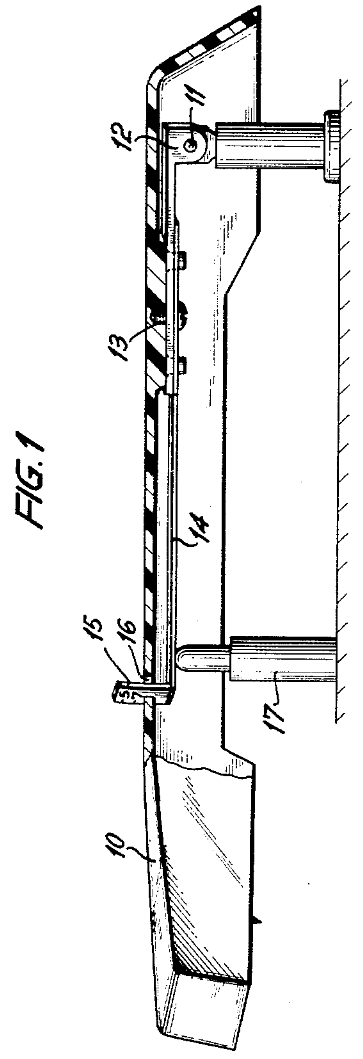
FIGS. 1 to 3 show side elevations partly in section of these different embodiments of the invention.

In accordance with FIG. 1 a tone-arm 10 is mounted by means of a bearing stirrup 12 so as to be pivoted about a horizontal axis 11. Together with the fixing screw 13 of the bearing stirrup 12 a leaf spring 14 is also mounted on the tone-arm in a horizontal position. The free end of the spring 14 bears an upright indicating scale 15 projecting upwards through an opening 16 of the tone arm. When the tone-arm is placed on the tone arm support 17, the spring is deflected in accordance with the weight of the pick-up.The indicating scale shows the pick-up weight in grammes.

Figures 2, 4:
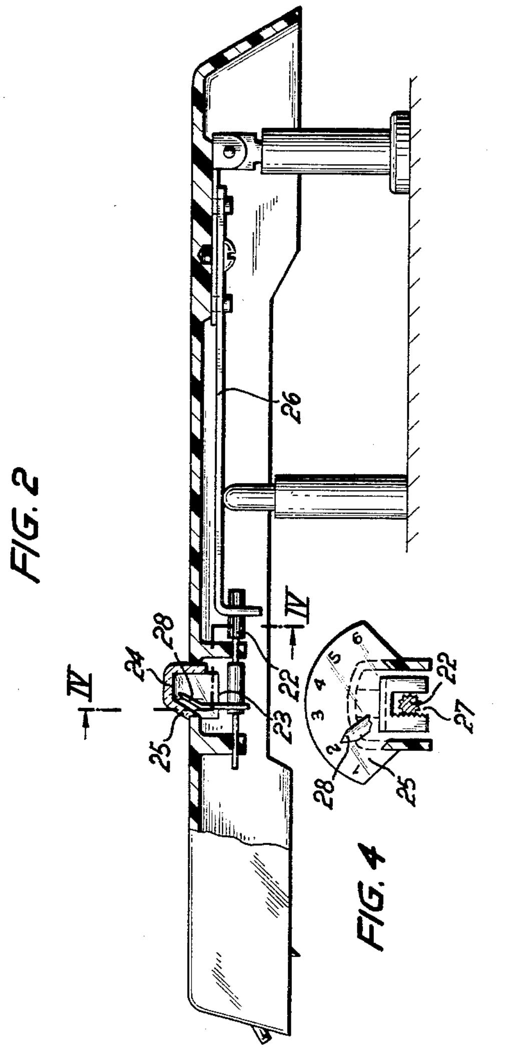
FIG. 4 is a sectional view on the line IV—IV in FIG. 2.

In the example according to FIG. 2, the bent over end of leaf spring 26 has a slit 27 (FIG. 4) toothed on one side, in which a toothed axle 22 disposed in the longitudinal direction of the tone-arm. The wheel is provided with a pointer 28. A cut-out 23 on the surface of the tone-arm is covered by a transparent cap 24. The front surface 25 of the cap 24 behind which the pointer 28 moves is provided with numerals. When the pick-up is placed on the pick-up support the leaf spring 26 is caused to deflect. This causes the pointer axle 22 with the pointer to be turned by means of the toothed slit. The transmission ratio is so chosen that a clear indication of the pick-up supporting weight is obtained.

Figures 3, 5:
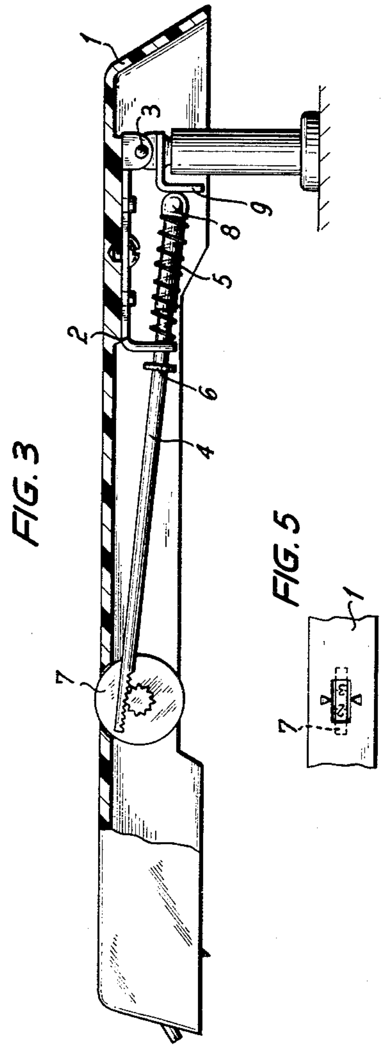
FIG. 5 is a fractional view of FIG. 3 from above.

In accordance with FIG. 3 a pick-up 1 is pivotally mounted by means of a bearing stirrup 2 about a horizontal axis 3. A racked bar 4 is guided in the bearing stirrup 2, the bar being slidable in the direction towards the pick-up mounting by means of a compression spring 5 up to a stop 6. The toothed end of the racked bar or rod 4 engages a pinion of a disc or drum 7 provided on its outer surface with numbers. When the pick-up arm 1 is in the playing position the stop 6 of the racked bar 4 is supported against the bearing stirrup 2, leaving a space between the end 8 of the racked bar 4 and the angle support or bracket 9. This support 9 forms part of the assembly supporting bearing stirrup 2 for pivotal movement about a vertical axis. When the pick-up arm is lowered for weighing, the bearing stirrup 2 is supported against the angle support 9 via compression spring 5 and the end 8 of the racked bar 4. This causes the disc 7 to be turned until the pick-up weight and the compression spring force are balanced. The numbers on the disc 7 are arranged vertically with respect to the axis of the disc 7 so as to be easily read (FIG. 5) and indicate the pick-up weight in grammes.

I claim:

1. In a phonograph record player, a tone arm having a normally horizontal longitudinal axis and a substantially flat upper surface, there being an aperture through said surface between the ends of said arm, means mounting said arm at a first end thereof, for oscillation about mutually normal, first and second, respectively, vertical and horizontal axes, said second axis being normal to said longitudinal axis, a force indicator mounted for movement within said aperture and readable from the top surface of said arm, and spring means carried solely by said arm and connected with said indicator to move the same by and in proportion to the unbalanced weight of said arm in off-record position, said indicator comprising a drum journaled on and below said arm for rotation on a normally horizontal axis, a bracket movable as a unit with said arm about said first axis only, and a spring-pressed bar mounted on and beneath said arm for axial translation relatively thereto, said bar engaging said bracket and drum at its respective ends, there being force-measuring graduations on the periphery of said drum and an index fixed with said arm for cooperation with said graduations.

2. The record player of claim 1, the axis of said drum being normal to said longitudinal axis, a pinion rotatable as a unit with said drum, a stirrup fixed to said arm adjacent the first end thereof, said rod being slidable through an aperture in said stirrup and having its contiguous end abutting said bracket, a coil spring mounted on and about said rod and having its ends abutting said stirrup and an abutment fixed with the contiguous end of said rod, and a rack fixed with the distal end of said bar and in mesh with said pinion.

References Cited by the Examiner

UNITED STATES PATENTS

| | | | |
|---|---|---|---|
| 186,267 | 1/77 | Nott | 177—229 |
| 363,873 | 5/87 | Witherell | 177—229 |
| 1,186,142 | 6/16 | Steiner | 177—229 X |
| 2,551,506 | 5/51 | Rockwell | 274—23 |
| 2,809,841 | 10/57 | Mueller | 274—23 |
| 2,884,256 | 4/59 | Proctor | 274—23 |
| 3,020,051 | 2/62 | Zimmermann et al. | 274—23 |

NORTON ANSHER, *Primary Examiner.*

ALDRICH F. MEDBERY, *Examiner.*